United States Patent [19]

Margolin et al.

[11] 4,230,938

[45] Oct. 28, 1980

[54] COMPUTER INPUT/OUTPUT DEVICE

[75] Inventors: George D. Margolin, Newport Beach; Victor V. Vurpillat, Laguna Niguel, both of Calif.

[73] Assignee: Centurion Data Corporation, King of Prussia, Pa.

[21] Appl. No.: 879,116

[22] Filed: Feb. 21, 1978

[51] Int. Cl.² .............. G06K 7/06; G06K 19/06; G01D 15/08; G03G 17/00

[52] U.S. Cl. .................. 235/441; 235/492; 346/163; 358/295

[58] Field of Search ............ 346/150, 153, 165, 155, 346/163; 235/492, 441, 458, 439, 440, 451, 494, 489, 453; 364/786; 340/149 A; 358/294, 295; 360/87, 100, 136

[56] References Cited

U.S. PATENT DOCUMENTS

| 2,572,871 | 10/1951 | Kline | 178/5 |
|---|---|---|---|
| 2,575,742 | 11/1951 | Baltin | 346/165 |
| 2,584,398 | 2/1952 | Pollard | 358/295 |
| 2,732,276 | 1/1956 | Ridings | 358/295 |
| 3,465,960 | 9/1969 | Swenson | 235/441 |
| 3,511,973 | 5/1970 | Best | 235/441 |
| 3,581,063 | 5/1971 | Levasseur | 340/149 A |
| 3,660,641 | 5/1972 | Levasseur | 235/438 |
| 3,781,904 | 12/1973 | Firnig | 346/163 |
| 3,816,839 | 6/1974 | Honda | 346/163 |
| 3,835,301 | 9/1974 | Barney | 235/441 |
| 3,890,488 | 6/1975 | Lee | 178/3 |
| 3,914,546 | 10/1975 | Hamaker | 178/7.6 |
| 3,918,633 | 11/1975 | Maurer | 235/453 |
| 3,932,730 | 1/1976 | Ambrosio | 235/365 |
| 3,947,661 | 3/1976 | Silverman | 235/489 |
| 3,973,237 | 8/1976 | Sawaguchi | 194/4 R |
| 3,997,763 | 12/1976 | Schasser | 194/DIG. 23 |
| 4,027,142 | 5/1977 | Paup | 346/75 |
| 4,100,551 | 7/1978 | King | 346/163 |

Primary Examiner—Robert M. Kilgore
Attorney, Agent, or Firm—David S. Woronoff

[57] ABSTRACT

A combination electrosensitive reader-printer able to perform both functions by sensing the condition of a recording medium in the read mode and by altering the condition of the recording medium in the printing mode. The change of mode is accomplished manually or automatically. The data to be read or written may be coded optically or digitally for interpretation by a processor. The recording medium is a metalized paper or similar material with an ink under or over lay. The resistivity, conductivity or capacitance change of the medium is sensed or altered by the reader-writer. Appropriate timing tracks and registration marks are normally placed to enable reading and writing by different devices. The styli for reading and writing normally are disposed in an array, straight or angled relative to the paper path. The styli have tips which are cylindrical, rectangular or oval in cross section. Control circuitry, including an analog to digital converter, control input to and output from the reader-printer.

35 Claims, 9 Drawing Figures

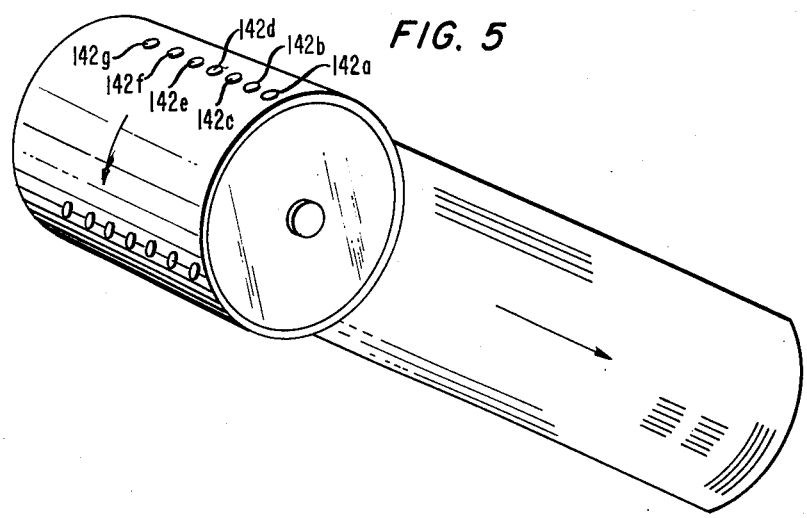
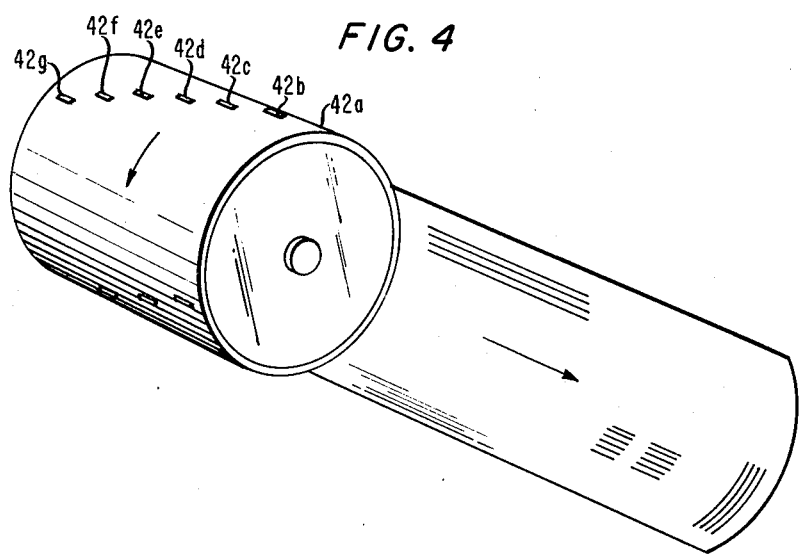
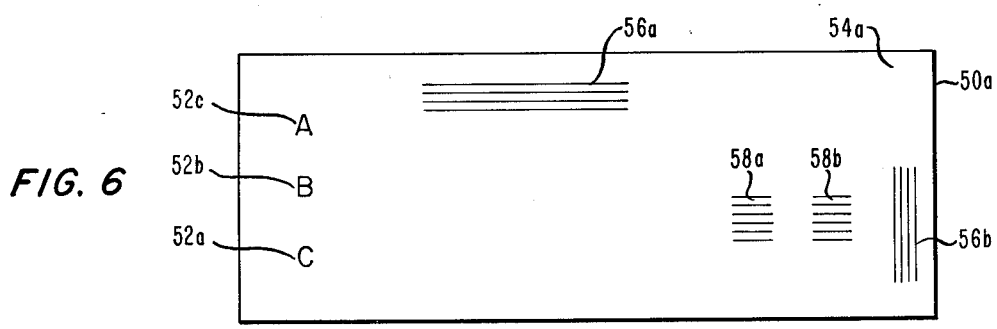

COMPUTER INPUT/OUTPUT DEVICE

CROSS REFERENCES TO RELATED APPLICATION

The present application is related to three other patent applications filed on the same date as the present application and assigned to a common assignee. Those applications are:

1. "Check", invented by Vincent G. Bell, Thomas P. Burke, Victor V. Vurpillat, and George Margolin, Ser. No. 879,114
2. "Business Form", invented by Vincent G. Bell, Thomas P. Burke, George Margolin, and Victor V. Vurpillat, Ser. No. 879,113
3. "Computer System", invented by George Margolin and Victor V. Vurpillat, Ser. No. 879,115

These three other common co-pending applications are incorporated by reference to the present application as if they were reproduced herein.

BACKGROUND OF THE INVENTION

A. Field of the Invention

The present invention relates to computers and more particularly to a computer input-output device which can read from and write onto electrosensitive paper. More particularly the invention relates to an electrosensitive reader-printer which can read from and write onto discrete pieces and rolls of electrosensitive paper. The invention also discloses the control circuitry to accomplish the previously described functions including an analog-to-digital converter and automatic and manual switching to switch from read to write and back to read.

B. Prior Art

The most relevant prior art which best illustrates the problems to be solved is U.S. Pat. No. 3,932,734. This patent shows a utility billing device having an optical reader and an electro-printer for darkening a ZnO coating on a carbon film. To achieve the objective of having one device both read from and write on a business form separate read and write mechanisms and media are required. A principal objective of the present invention is to solve that problem by providing one mechanism which can both read from and write on the same medium.

SUMMARY OF THE INVENTION

The present invention relates to a novel reader-printer combination. The invention has several novel features. The concept that an electro-sensitive printer can be adapted to read what it or another similar printer wrote is novel. In order to achieve this result modifications were made to the printer. Although common wire electrodes (styli) with cylindrical tips function adequately, modifications of styli position, styli shape and styli energization (in the print mode) improve performance of the device. A novel control circuit is utilized to control the timing of the print cycle because of the new styli configuration. A parallel input-output device which includes an analog to digital converter is used in the read mode to connect the data read into an appropriate form for entry into a micro-processor. Similarly in the write mode, digital data is converted to an analog signal.

The control of the reader-printer combination requires an electronic switch to energize the styli to read or write. In a typical embodiment of the present invention the read mode voltage applied to the styli is of the order of 5 volts while in the write mode the voltage applied to the styli is between 40 to 100 volts. The switch can have both a manual and an automatic mode of operation. An additional power supply can be used to operate the device in the read mode. In practice, this read mode power supply may function by reducing the voltage or amperage of the write mode power supply.

When the styli are positioned in a staggered array, the timing both for reading and writing is altered to compensate for the new position of the styli. The timing circuit to perform this function is a novel feature in the present invention.

Vertical timing and horizontal synchronization marks are desirable to help the input-output device to read material written by another similar printer. It will often be desirable to have the printer write in specific areas of a blank form. The vertical and horizontal synchronization marks are useful if printing of that precision is to be achieved.

The structural modifications of a printer to enable it to read are novel features of the present invention. The basic concept of the present invention applies if the printer is rotary, oscillating or stationary and if the paper is moving or stationary. The necessary elements are relative motion between paper and print head (or heads) and appropriate spacing, orientation and timing of the styli to enable printing in machine and humanly readable form. The relative motion may be either continuous or discrete as caused by a stepper motor for example. This concept is an important element of the present invention.

DESCRIPTION OF THE DRAWINGS

FIGS. 4, 5, 5A, and 5B show views of three embodiments of stylus configurations forming part of the present invention.

FIG. 6 is a plan view of an electrosensitive medium for use in connection with the present invention.

DESCRIPTION OF THE INVENTION

Figure 1:
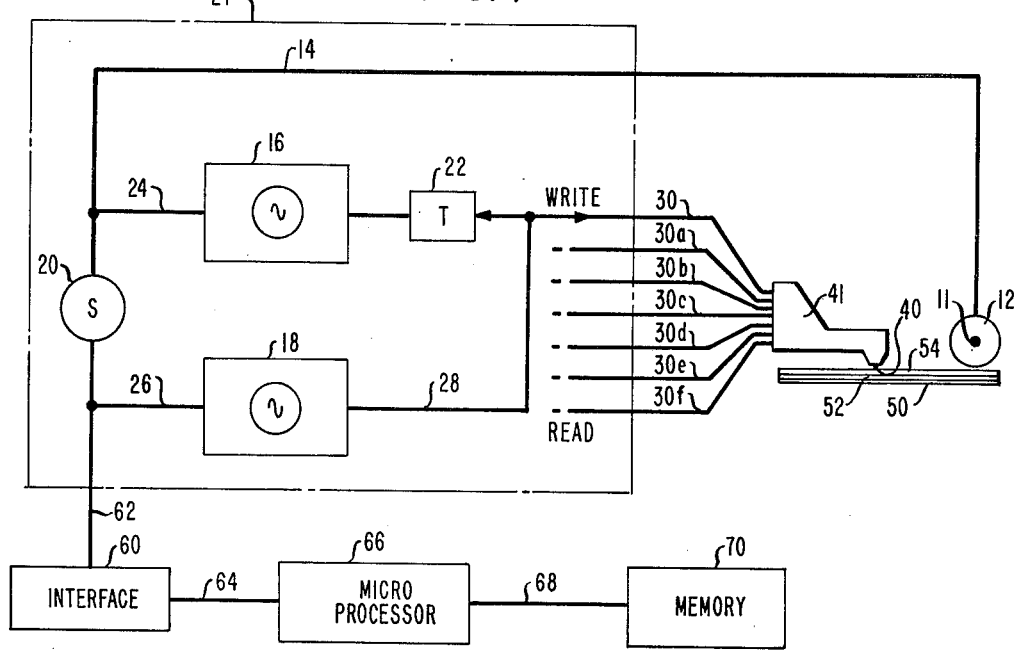
FIG. 1 is a block diagram of the present inventive electronic circuitry.
Figure 1A:
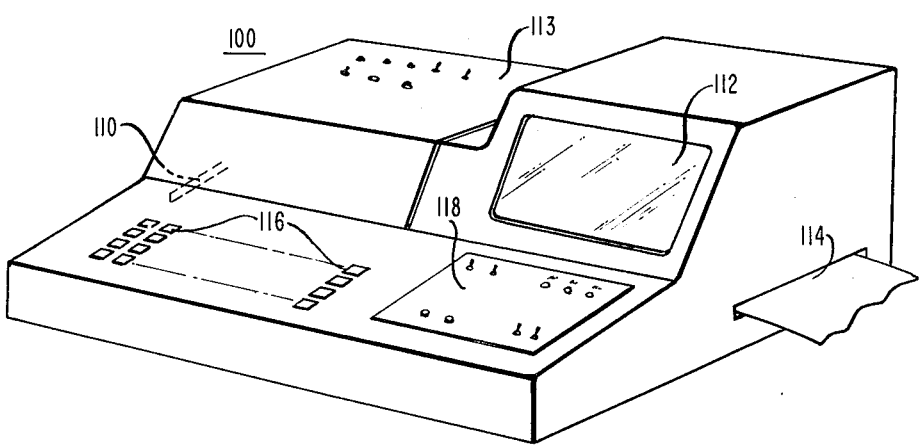
FIG. 1A is a perspective view of a console forming a part of the present invention.
Figure 2:
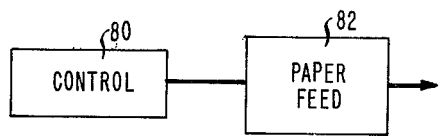
FIGS. 2 and 3 are block diagrams showing the control circuitry to operate the paper feed and the stylus motion respectively.
Figure 3:
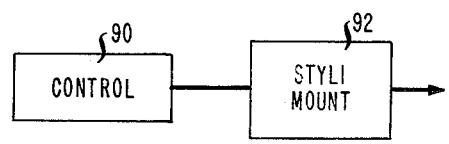

FIG. 1 shows a Microprocessor 66 interconnected to control mechanism 21 through an interface device 60.

A memory device 70 is also connected to the microprocessor 66. Within the control mechanism 21 is a switch 20 to control its output through leads 30, 30a, 30b, 30C, etc. A pair of power supplies 16 and 18 are shown supplying power to two different modes of operation of the control mechanism 21, namely the "read" mode and the "write" mode. A timing mechanism 22 controls the output of the source 16 to the write mode.

The leads 30 etc. connect to a plurality of styli 40 which are positioned (for writing and reading) over a piece of electrosensitive material 50. The particular material shown has a paper layer 50, an ink layer 52 and an aluminum layer 54. A ground contact 12 on the conductive layer 54 is interconnected to the control device 21 by lead 14.

In operation when switch 20 is in the write mode, power supply 16 generates a DC or AC signal (up to radio frequency range) of magnitude from about 40 to about 100 volts. When switch 20 is in the "read" mode the power supply 18 generates a DC output in the 5 to 16 volt range. Power supply 18 can be generated by stepping down the output of supply 16. In one embodiment of the present invention, the output supply 16 generates a positive output to leads 30, 30b, etc. and a negative output to leads 30a, 30c, etc. In such an embodiment positive and negative output are relative terms, i.e., one stylus may be positive and its neighbor ground or neutral. In order for the device 21 to control reading or writing of much significance, some device for causing relative motion between the stylus 40 and the paper 50 must be provided. Several printers are commercially available which show such operation, one is the product of SCI, Inc. of Huntsville, Alabama identified as model 1100, another is the product of Axiom Corporation of Glendale, California, identified as model EX800. The SCI printer is a rotary printer in which the styli rotate and the paper is propelled past the styli. The detailed function of this device is described in U.S. Pat. No. 3,998,315 and in U.S. Pat. Application Ser. No. 611,785 filed Sept. 9, 1975. Whatever method is chosen the paper feed 82 is controlled by a device 90. As the SCI device indicates both styli and paper can be in motion and the present invention encompasses the composite motion of the styli and paper.

FIGS. 4 and 5 show two different embodiments of styli in two different configurations. The styli 42a etc. shown in FIG. 4 have rectangular shapes with the longer dimension in the direction of paper motion. The styli 142a shown in FIG. 5 have oval tips with the longer dimension at an acute angle to the direction of paper motion. An angle of about 45 degrees appears to give good results.

The styli 42a etc. are shown in staggered array with the longer dimension large enough for the styli tips to touch or overlap if the "stagger" were eliminated. The stagger can be thought of as a tilted and skewed array of styli.

The skewing or twisting of the styli as shown in FIGS. 4 and 5 give additional strength to the array which is important during the read operation.

The styli 142a etc. shown in FIG. 5 are shown in an oblique array in which the styli tips would touch or overlap if the oblique angle were reduced to zero. The styli tips as shown in FIG. 5 would touch or overlap if the styli 142a, etc, were rotated in a clockwise direction.

Although the FIG. 4 styli 42a etc. have rectangular tips and the FIG. 5 styli 142a etc. have oval tips, the two shapes may be interchanged to give four different styli embodiments. Shown in FIG. 5b, styli with round or cylindrical tips are well known. To improve the performance of such styli during the read mode it is useful to twist the styli as shown in FIG. 5A. The twist permits the styli to flex in the proper direction and therefore ride more smoothly over the surface to be written or read. The twist is applied about midway in the length of the styli.

To enable the styli shown in FIG. 4 to write a straight line the activation of the styli in the write mode is appropriately staggered by the timing device 22 shown in FIG. 1.

In operation the styli are maintained in very light sliding contact with the electrosensitive material 50. The write voltages of between 40 and 100 volts AC or DC are applied for about 100 microseconds. During the write cycle the aluminum layer 54 is vaporized exposing the underlying ink layer 52. This allows the document to be humanly or machine readable. The read and write speeds of the device are substantially equal but the read voltages are in the 5 to 16 volt range. The read voltage may be AC or DC and may be much higher than 16 volts but produce a low current flow.

An electrosensitive material 50a is shown in FIG. 6 having horizontal synchronization marks 56a, vertical synchronization marks 56b and timing tracks 58a, 58b and three colors of printing A, B, C, written thereon. The timing tracks 58a, 58b are useful for synchronous reading. The tracks 58a, 58b can be omitted and the reader can function synchronously. The three color A, B, C is achieved by using three different inks 52a, 52b, 52c under the aluminum layer 54a.

The timing tracks 58a, 58b are normally printed when the data on the paper is printed. The horizontal and vertical synchronization marks 56a and 56b may be printed by the device or by a separate printer. The horizontal lines 56a give accurate vertical position and the vertical lines 56b give accurate horizontal position. The number of synchronization lines and timing marks created will depend on the number of styli per head. A common configuration is a 7 stylus array. In such an array 6 bars will carry data allowing for 64 characters and one bar will be parity. When the styli "fire" across to adjacent styli 6 bars will create five lines of information. When the styli "fire" to ground six bars can be created by 6 styli. A compound system of evaporating the conductive layer from stylus to stylus and from stylus to ground has been found to work effectively also when using a seven stylus head and bar code character can be written using five styli for writing and two styli for spacing. When writing graphics the two spacing styli are able to draw continuous lines. The styli may create as many lines on the electrosensitive material as they are controlled to do.

For reading or writing synchronously a single stylus can either read or write the timing track.

When a user wants to read from a previously written document 50 (such as a check or business form), he places the document to be read in the input hopper 110 and sets the switch 20 to the read mode. The input-output device moves the document from the hopper into position under the read-write heads. This reader detects the horizontal, vertical and timing marks and makes the appropriate adjustment of the position of the document feed device or the read heads depending on the type of reader. The document's relative movement past the read head continues. In the read mode the styli are energized through the interface device 60 to a low voltage range. The styli, in light contact (about 1 gram) with the document, sense a change in resistance, conductance or capacitance as the styli move from aluminum to ink back to aluminum on the written document. Changes in the resistance, conductance or capacitance are changes in the electrical properties of the electrosensitive material. The read head senses the bar code writing resistively conductively, or capacitively. The interface device 60 converts the sensed data to appropriate digital form for transmittal to the microprocessor 66. The microprocessor 66 is set to either display the data received on a CRT 112 or to transmit it to local or remote memory. At the completion of the read cycle, the document is deposited in the output hopper 114 for later removal by the user.

When a user wishes to write on a document he loads the document into the input hopper 110 and sets switch 20 to the write mode. The user then selects the source of the writing. He may write from information in local or remote memory (not shown) or from information supplied through a keyboard 116 or from information from another document in a second input hopper i.e., input-output devices operating in tandem. When input-output devices operate in tandem they can function as facsimile machines with the important difference that output in digital form can be fed directly to a processor or memory. Whatever the source of the data to be written, the operator must either through program or keyboard instruction direct the printer to write in machine readable or humanly readable form or both. Assuming, for illustration that both modes of writing are chosen and that information from local memory is to be written, the user enters the appropriate information through the keyboard. The document is moved from the input hopper to the writing heads (or the writing heads are moved over the input hopper). The horizontal and vertical synchronization tracks (if present) are sensed and then the heads shift to write automatically. A timing track (for synchronous reading) is immediately generated for later use during the read mode. The program controlling the microprocessor 66 directs the heads 40 to write in code or alpha-numeric in the appropriate place on the document. The digital data in the microprocessor memory is converted by the interface 60 which includes a PIO and an A to D converter into a proper analog form for transmission to the write heads and styli. The output voltage of about 40 to 100 volts for about 100 microseconds is fed to a particular stylus whenever it is desired to make a mark on the document. This energy is sufficient to vaporize the upper layer and expose the underlying layer of the document. The styli may be energized relative to ground or relative to adjacent styli depending on the program in the microprocessor and the configuration of the interface. The timing for energization of the styli will depend on the position of the stylus array and on what is to be written. When the write cycle is complete, the document is moved to an output hopper or the write head has returned to its rest position. In either read or write modes an automatic document feed allows the stacking of documents.

What is claimed is:

1. An input and output device able to read from and write on electrosensitive material comprising:
   first sensing means; said sensing means comprising a plurality of styli;
   first controlling means for controlling said sensing means, said control means having a high level output and a low level output and a switch means to control which output level is operative;
   first moving means for causing relative motion between said sensing means and said paper; and,
   said first sensing means is operable under the control of said first controlling means to write on said electrosensitive material and also to be able to read what was written, said electrosensitive material having a removable outer surface which when removed changes the electrical characteristics of the electrosensitive material.

2. The device claimed in claim 1 wherein:
said first sensing means comprise a plurality of styli arranged in a staggered pattern to be relative motion between said sensing means and said paper.

3. The device claimed in claim 1 wherein:
said first sensing means comprise a plurality of styli arranged in an oblique angle with respect to the direction of relative motion between said sensing means and said paper.

4. The device claimed in claim 1 wherein:
said sensing means comprise a plurality of styli having tips with a rectangular shape.

5. The device claimed in claim 4 wherein:
said tips are disposed at an oblique angle to the direction of said relative motion and said adjacent tips would touch if said oblique angle were nearly zero degrees.

6. The device claimed in claim 1 wherein:
said sensing means comprises a plurality of styli having tips with an oval shape.

7. The device claimed in claim 6 wherein:
said styli are disposed in a staggered array and the tips of said styli are of such size that they would touch if the array were not staggered.

8. The device claimed in claim 1 wherein:
said sensing means comprises at least one stylus means adapted to receive a pulse of electrical energy from said control means for writing and a substantially constant supply of electric energy for reading.

9. The device claimed in claim 8 wherein:
said stylus means comprises a plurality of styli in which adjacent styli receive pulses of opposite polarity of electrical energy.

10. The device claimed in claim 1 wherein:
said control means comprises an analog-to-digital converter means and switching means for switching said first sensing means from read to write and from write to read.

11. The device claimed in claim 10 wherein:
said control means also comprises a parallel-to-serial converter means such that the analog signals read from said paper are converted to proper form for input to a digital device.

12. The device claimed in claim 11 including further:
an electrosensitive paper having a metal layer in which said pulse of electrical energy evaporates a portion of said metal layer in a form which is humanly readable.

13. The device claimed in claim 11 including further:
an electrosensitive paper having a metal layer in which said pulse of electrical energy evaporates a portion of said metal layer in a form which is machine readable by said first sensing means.

14. An input device able to read from an electrosensitive material having an outer coating vaporizable by an electric discharge, said input device having a plurality of cyclable styli, means for causing relative motion between said material and said plurality of styli, means for causing the cycling of said styli, electrical means for applying to said styli a signal for enabling the read operation of said device by sensing a change in the electrical properties of the electrosensitive material.

15. The input device claimed in claim 14 wherein:
said styli have a generally cylindrical shape with a circular cross section.

16. The input device claimed in claim 15 wherein:
said styli have a twist formed in said cylindrical shape.

17. The input device claimed in claim 16 wherein:
said twist is formed about midway in said cylindrical shape.

18. The input device claimed in claim 14 wherein:

said electrical means includes an analog-to-digital converter means and a parallel-to-serial conversion means such that the information read by said styli is arranged in a form suitable for use by a digital computer.

19. The input device claimed in claim 14 wherein:
said styli are disposed in an array oblique to the said direction of relative motion.

20. The input device claimed in claim 19 wherein:
said styli have tips having an oval end.

21. The input device claimed in claim 19 wherein:
said styli have tips having rectangular ends.

22. The input device claimed in claim 19 wherein:
said styli array when positioned perpendicularly to said direction of relative motion would have adjacent styli in contact.

23. The input device claimed in claim 18 wherein:
said styli can be controlled by second electrical means to write on said electrosensitive material.

24. The input device claimed in claim 23 wherein:
said electrosensitive material comprises a plurality of layers at least two of which are of different electrical conductivities and color and said material is formed into sheets.

25. The input device claimed in claim 24 wherein:
said electrosensitive material has vertical and horizontal code marks placed thereon for being sensed by said styli.

26. The input device claimed in claim 25 wherein:
said electrosensitive material has at least one of said layers vaporizable by said styli.

27. The input device claimed in claim 26 wherein:
said styli are energized to a voltage level not to exceed about 100 volts for a time not to exceed 500 microseconds.

28. The input device claimed in claim 27 wherein:
said styli are energized by alternating current.

29. The input device claimed in claim 27 wherein:
adjacent styli are energized by a signal of different polarity.

30. A cycling printer using the electrical discharge between cycling styli and an electro-responsive record sheet to form printing on said sheet and also to be able to read the printing on said sheet comprising in combination: a means for cycling the styli, at least one group of styli mounted on said cycling means, the styli in said group being closely adjacent one another and aligned on an axis, a platen forming a suface over which said styli sweep when said cycling means is operative, said sheet having the form of an elongated strip, feed means for feeding said strip between said platen and said styli in a direction transverse to the plane of said cycling, styli power supply means having first and second levels of power output, control switch means for determining which of said power supply levels is actuated, said first level of power supply enabling said styli to write on said elongated strip and said second level of power supply enabling said styli to read from said elongated strip.

31. The printer in claim 30 wherein:
said styli have tips which have a rectangular end.

32. The printer in claim 31 wherein:
said styli tips would at least touch if one of said array or said angle were perpendicular to said direction of motion.

33. The printer in claim 30 wherein:
said styli have tips which have an oval end.

34. The printer in claim 33 wherein:
said styli tips would at least touch if one of said array or said angle were perpendicular to said direction of motion.

35. In a rotary electrical printer including a rotor, means for rotating said rotor, at least one group of styli on said rotor, feed means for moving a recording sheet past said rotor in a direction transverse to the direction of rotation of said rotor with said styli contacting said sheet, said group including a plurality of axially-spaced styli, said electrical control means for selectively energizing said styli at first and second levels of power output to cause each stylus to read and form a dot on said sheet, depending on which output level is actuated, at a selected location and thereby form and also to be able to read images from transverse rows and circumferential columns of such dots, the styli in said group being positioned closely adjacent to one another so as to form a group of contiguous columns during a single pass of said styli over said recording sheet.

* * * * *